Sept. 17, 1968 W. J. HANNAN ET AL 3,402,355

ELECTRONICALLY VARIABLE DELAY LINE

Filed Jan. 5, 1965

William J. Hannan
Joseph F. Schanne, Jr.,
*INVENTORS.*

BY Harry M. Saragovitz
Edward J. Kelly
Herbert Berl
Robert C. Sims

ATTORNEYS

3,402,355
ELECTRONICALLY VARIABLE DELAY LINE

William J. Hannan, Moorestown, N.J., and Joseph F. Schanne, Jr., Philadelphia, Pa., assignors, by mesne assignments, to the United States of America as represented by the Secretary of the Army Filed Jan. 5, 1965, Ser. No. 423,615
6 Claims. (Cl. 328—151)

ABSTRACT OF THE DISCLOSURE

A delay line consisting of a cascade of storage capacitors and switches separated by buffer amplifiers, the switches operate at a data sampling rate and are used to transfer the signal level stored on each capacitor to the adjacent capacitor, and the drive signal to alternate switches are displaced by one-half the sampling period.

Figure 1:
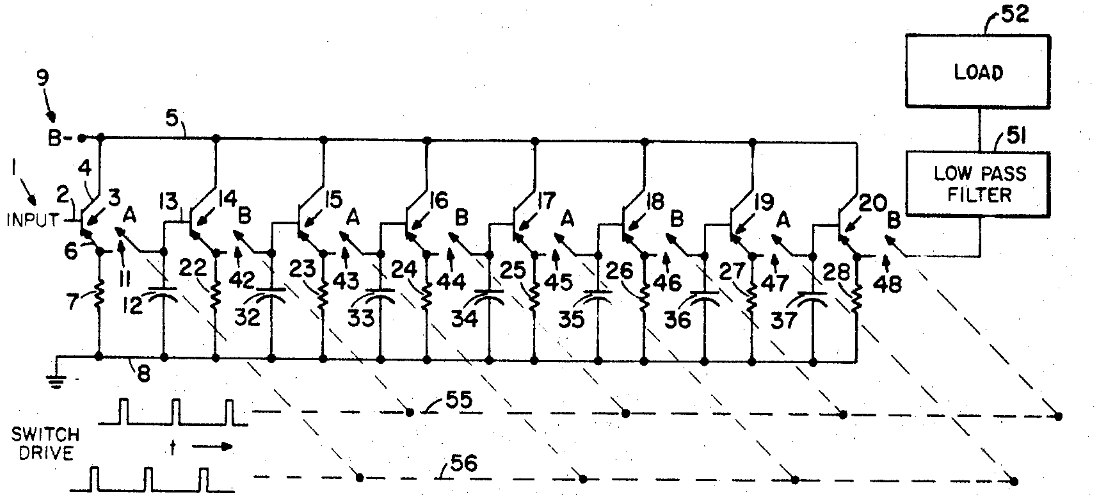

The need for a good reliable electronically variable delay line is very acute at the present time and probably will be for a long time in the future. The variable delay lines now in use are either too expensive, complicated or suffer excessively from one or more of the following faults: (1) crosstalk between input signal and control signal, (2) input and output impedances of the line are dependent on the control signal, and (3) no simple way of increasing the delay time of a given unit.

It is, therefore, an object of this invention to provide a reliable electronically variable delay line which does not have any crosstalk between input signal and control signal.

Another object of the present invention is to provide a variable delay line in which the input and output impedances of the line are independent of the control signal.

Still another object of this invention is the creation of a delay line in which the delay time can be increased by simply adding additional delay modules thereto or by controlling the hold time of the line.

Figure 2:
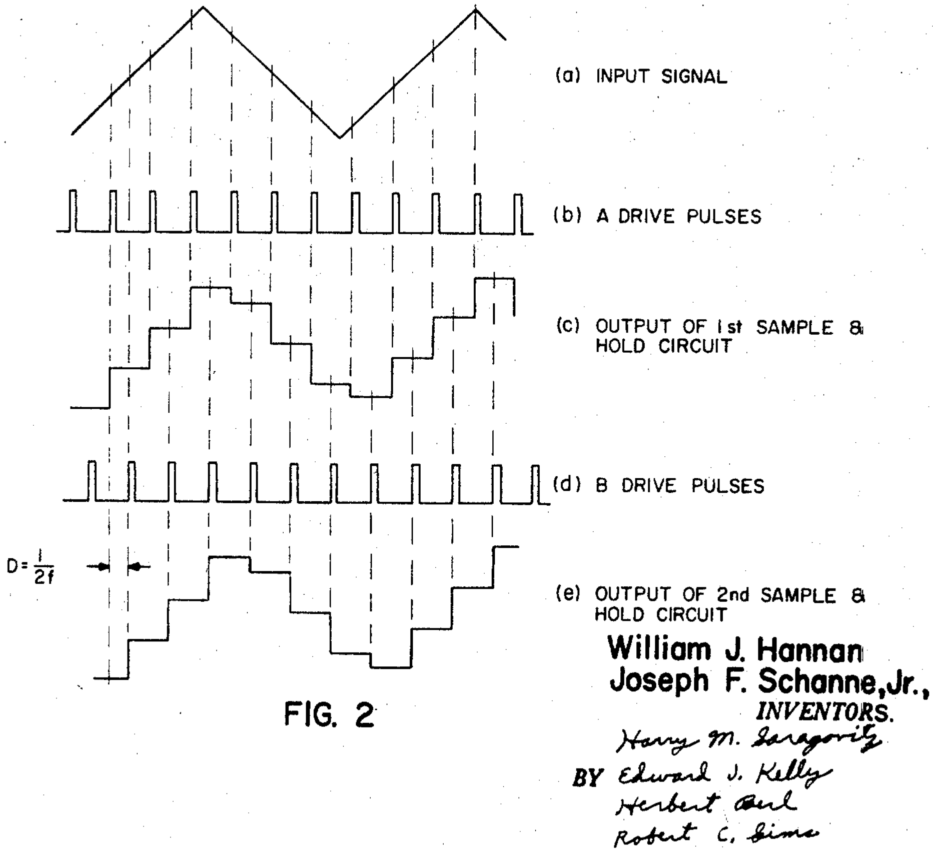

The invention further resides in certain novel features of construction, combinations and arrangements of parts. Further objects and advantages of the invention will be apparent to those skilled in the art to which it pertains, from the following description of the preferred embodiment thereof described with reference to the accompanying drawing, which forms a part of the specification; and wherein the same reference characters represent corresponding parts throughout the drawing; and in which:

FIGURE 1 shows a schematic diagram illustrating a preferred form of the present invention; and FIGURE 2 illustrates waveforms (wherein the abscissa is time and the ordinate is voltage) of signals applied to and derived from the circuit of FIGURE 1.

The invention may be better understood with reference to the drawings in which there is shown the electronically controlled sample-and-hold delay line of the present invention. An input 1 is applied to a base electrode 2 of a transistor 3. The collector electrode 4 of the transistor 3 is connected to line 5, whereas the emitter electrode 6 is connected to one end of a resistor 7. The other end of the resistor 7 is connected to the line 8. A source of DC voltages 9 is connected across lines 5 and 8. Line 8 is shown as being connected to ground, however in some cases this may not be desirable and therefore may be omitted. If so done, the connections from the signal input 1 and DC supply 9 would have to be direct. A switch 11 connects emitter electrode 6 to one end of a capacitor 12. The other end of capacitor 12 is connected to line 8. Said one end of capacitor 12 is also connected to a base electrode 13 of transistor 14. The connections of transistors 14 through 20, resistors 22 through 28, capacitors 32 through 37, and switches 42 through 48 are connected to each other and to lines 5 and 8 in a similar manner to form other sample and hold circuits. A low pass filter 51 is connected to switch 48, and a load 52 is connected to the other side of the filter 51. The switch drive units 55 and 56 may take the form of any of the known switch driving means which are adaptable to this system (such as a pulse generator driving solenoids of the switches so as to open or close the switches 11 and 42 through 48 or the switches can be solid state switches which are driven electronically). More sets of transistors, resistors, capacitors and switches (sample and hold circuits) may be added to the network in front of the low pass filter 51 or some of the sets could be removed to change the delay.

*Operation*

Broadly the sample-and-hold delay line consists of a cascade of storage capacitors and switches separated by buffer amplifiers. The switches are used to transfer the signal level stored on each capacitor to the adjacent capacitor. All switches operate at a given data sampling rate but the drive signals to alternate groups of switches A and B are displaced by one-half the sampling period. That is, referring to FIGURE 1, the A switches and the B switches are closed alternately, just long enough for the capacitors to store the new signal level.

More specifically, the sample-and-hold delay line has a transistor 3 which receives the input signal and causes said signal to be transferred to capacitor 12 when switches A are closed (more specifically, when switch 11 is closed). Capacitor 12 will now be charged until it is at a voltage equal to that of the signal voltage. This is shown by waveform *c* of FIGURE 2. The reason that the capacitor 12 will be charged to this voltage is because transistor 3 will be in an "on" state as long as its emitter electrode is positive with respect to its base electrode. This will be the case until capacitor 12 is charged (or discharged) to a value equal to the signal value 1 at base 2 of transistor 3. Since the emitter electrode 6 is tied to capacitor 12 by switch 11, it will be at the same voltage level, and when capacitor 12 is charged by source 9 to a value equal to the input signal 1, transistor 3 will be cut "off." If the charge on capacitor 12 makes the voltage at emitter 6 negative with respect to base 2 the transistor 3 will not be cut on, and capacitor 12 will discharge through resistor 8 and switch 11 until the voltage on the capacitor 12 is positive with respect to base electrode 2; at which time transistor 3 will be turned on.

Capacitor 12 will now hold the signal until the switch drive causes switches B to close. With switch 42 closed capacitor 32 is ready to sample the signal. Transistor 14, which has been on, allows source 9 to charge capacitor 32 to the level of that charge on capacitor 12 (see waveform *e* of FIGURE 2) as explained above. The signal will pass down each of the sample and hold circuits in this manner until it passes out through a low pass filter 51 to a load 52.

Since the drive pulses are displaced by one-half the sampling period, the total delay between input and output of the delay line is:

$$D=n/2f \qquad (1)$$

where $n$ is the number of sampling stages, $f$ is the sampling rate, and D is the total delay. Clearly, changing the sampling frequency $f$ changes the time delay. Control of time delay by controlling the sampling frequency is a simple and convenient way of control.

The delay variation that can be realized is:

$$\Delta D=D_{\max}-D_{\min} \qquad (2)$$
$$=\frac{n}{2}\left(\frac{1}{f_{\min}}-\frac{1}{f_{\max}}\right)$$

If we let $f_{max}=af_{min}$, wherein $a$ is a constant of practical value, the delay variation can be expressed as:

$$\Delta D=\frac{n}{2f_{min}}\left(1\frac{1}{a}\right) \quad (3)$$

and solving for $n$ we get $$n=2f_{min}\Delta D\left(\frac{a}{a-1}\right) \quad (4)$$

It is well known that preservation of input information requires that:

$$f_{min}>2B \quad (5)$$

where B is the highest frequency component of the input signal. Hence the number of stages can be expressed as $$n\geqq 4B\Delta D\left(\frac{a}{a-1}\right) \quad (6)$$

It is evident that the minimum number of stages required is directly proportional to the delay bandwidth product (BΔD). From this, one can select a proper delay line of ones already set up or one will know just how many sample and hold circuits to set up in the delay line to be used.

A preferred embodiment of the invention has been chosen for purposes of illustration and description. The preferred embodiment illustrated is not intended to be exhaustive nor to limit the invention to the precise form disclosed. It is chosen and described in order to best explain the principles of the invention and their application in practical use to thereby enable others skilled in the art to best utilize the invention in various embodiments and modifications as are best adapted to the particular use contemplated. It will be apparent to those skilled in the art that changes may be made in the form of the apparatus disclosed without departing from the spirit of the invention as set forth in the disclosure, and that in some cases certain features of the invention may sometimes be used to advantage without a corresponding use of other features. It is therefore to be understood that within the scope of the appended claims the invention may be practiced otherwise than as specifically described. Accordingly, it is desired that the scope of the invention be limited only by the appended claims.

We claim:

1. A variable delay line as set forth in claim 6, wherein said sample and hold circuits are supplied by a source of voltages connected across the first and third junctions of each sample and hold circuit.

2. A variable delay line as set forth in claim 1, wherein said amplifier is a triode amplifier, and the input is across an input terminal of the triode and said first junction.

3. A variable delay line as set forth in claim 2, wherein said triode is a transistor.

4. A variable delay line as set forth in claim 3, further comprising a low pass filter connected between the output of the last sample and hold circuit and a load.

5. A variable delay line as set forth in claim 6, wherein a delay of said signal source is varied by selection of the number of sample and hold circuits.

6. A variable delay line comprising a plurality of sample and hold circuits each having an input and an output; said circuits being cascade connected such that the input of each circuit, except the first circuit in the cascade, is connected to an output of a preceding sample and hold circuit; a signal source to be delayed is connected to the input of said first sample and hold circuit; the output of a last one of said circuits in the cascade constitutes an output of the delay line; the input of said first circuit constitutes an input of said delay line; each of said sample and hold circuits having a switch means for controlling when it will sample a signal on its input; switch driving means connected to said switches so as to control the rate of closure of the switches such that a period of time between successive closures of a given switch is the same for each of said switches; alternate groups of circuits have their switches closed by the switch drive at the same time; time displacement of closures of one group to another is one-half said period of time; a delay of said signal source is varied by changing said period of time; said switch drive means is so constructed that said switches are in a closed position only for a short amount of time compared with said period of time; and wherein said sample and hold circuits each consist of a first, second, third, and fourth junction; a resistor connected between said first and second junctions; an amplifier having an emitter-collector path connected between said second and third junctions; said switch being connected between said second and fourth junctions; a capacitor is connected between said first and said fourth junctions; an input of said amplifier serving as the input for the sample and hold circuit; and said fourth junction serving as the output for the sample and hold circuit.

References Cited

UNITED STATES PATENTS

| | | | |
|---|---|---|---|
| 2,403,955 | 7/1946 | Schlesinger | 328—122 |
| 3,084,288 | 4/1963 | Ikard | 328—122 |
| 3,172,043 | 3/1965 | Altman | 328—67 |
| 3,281,686 | 10/1966 | Cochran | 328—151 |
| 3,286,101 | 11/1966 | Simon | 328—151 |
| 3,333,110 | 7/1967 | Schanne | 328—67 |

ARTHUR GAUSS, *Primary Examiner.*

H. DIXON, *Assistant Examiner.*